(12) United States Patent
Okaya

(10) Patent No.: US 7,822,973 B2
(45) Date of Patent: Oct. 26, 2010

(54) AUTHENTICATION KEY DEVICE HAVING MEDIA CONTENT STORAGE AND RENDERING CAPABILITIES

(75) Inventor: Ken P. Okaya, Newburyport, MA (US)

(73) Assignee: Motorola Mobility, Inc., Libertyville, IL (US)

( * ) Notice: Subject to any disclaimer, the term of this patent is extended or adjusted under 35 U.S.C. 154(b) by 971 days.

(21) Appl. No.: 11/617,358

(22) Filed: Dec. 28, 2006

(65) Prior Publication Data

US 2008/0162925 A1    Jul. 3, 2008

(51) Int. Cl.
*G06F 9/00*     (2006.01)
*H04L 9/32*     (2006.01)

(52) U.S. Cl. .............................. 713/155; 713/150; 713/1

(58) Field of Classification Search ................. 713/155, 713/150, 1
See application file for complete search history.

(56) References Cited

U.S. PATENT DOCUMENTS

| | | | |
|---|---|---|---|
| 5,642,418 A | 6/1997 | Farris et al. | |
| 5,666,293 A | 9/1997 | Metz et al. | |
| 5,887,253 A | 3/1999 | O'Neil et al. | |
| 6,003,100 A | 12/1999 | Lee | |
| 6,038,551 A | 3/2000 | Barlow et al. | |
| 6,169,976 B1 | 1/2001 | Colosso | |
| 6,298,336 B1 | 10/2001 | Davis et al. | |
| 6,496,981 B1 | 12/2002 | Wistendahl et al. | |
| 6,832,349 B1 | 12/2004 | Seamans | |
| 7,036,738 B1 | 5/2006 | Vanzini et al. | |
| 2001/0037303 A1 | 11/2001 | Mizrahi | |
| 2002/0046083 A1 | 4/2002 | Ondeck | |
| 2002/0140871 A1 | 10/2002 | Piotrowski et al. | |
| 2002/0157115 A1 | 10/2002 | Lu | |
| 2003/0070174 A1 | 4/2003 | Solomon | |
| 2003/0115465 A1 | 6/2003 | Wodzianek et al. | |

FOREIGN PATENT DOCUMENTS

WO    9831114 A1    7/1998

OTHER PUBLICATIONS

"Two factor authentication" Searchsecurity.com Page last updated on Jul. 19, 2004.*
Using modular code processes for network device management with automated boot-time device registration Greenwood, D.P.A.; Communications, 1999. ICC '99. 1999 IEEE International Conference on vol. 2 Publication Year: 1999 , pp. 1393-1397 vol. 2.*
Wireless networks of opportunity in support of secure field operations; Stehle, P.H.; Lewis, M.G.; MILCOM 97 Proceedings; vol. 2 ; Publication Year: 1997 , pp. 676-681 vol. 2.*

(Continued)

*Primary Examiner*—David Y Jung

(57) ABSTRACT

An arrangement is provided in which an authentication key with media content and storage capabilities is configured as a removable module that interoperates with a set top box ("STB") to enable two-factor authentication to be implemented when authenticating a user to unblock media content recorded by a digital video recorder that is restricted using, for example, parental control or blocking features provided by the STB. The authentication key is also arranged with a memory to store recorded media content that is accessed from the STB which functions as an intermediary, or "proxy" device, to facilitate selecting, receiving, and recording media content from a distribution network. The authentication key is also configured with an onboard video processor that enables the authentication key to perform as a portable media player that can drive, in various illustrative examples, a built-in display device or external presentation devices such as television or monitor.

20 Claims, 12 Drawing Sheets

OTHER PUBLICATIONS

Pervasive computing goes the last hundred feet with RFID systems; Stanford, V.; Pervasive Computing, IEEE; vol. 2, Issue: 2 Publication Year: 2003, pp. 9-14.*

"New Products: Vela Research's CineView brings MPEG-2 Video to PC Screens", EMedia Professional, v10, n11, p. 28, Nov. 1997, ISSN: 1090-946X.

* cited by examiner

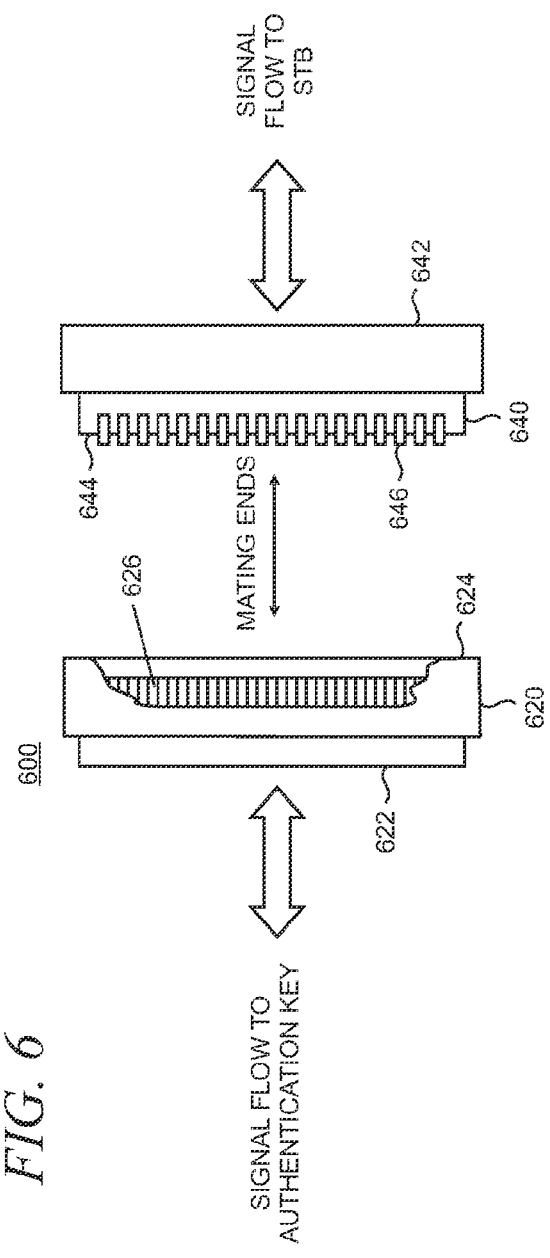
FIG. 6
FIG. 7
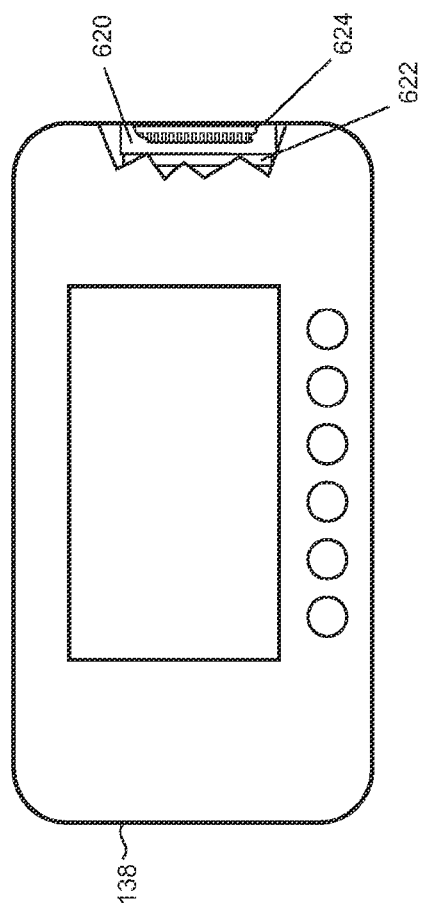
FIG. 8

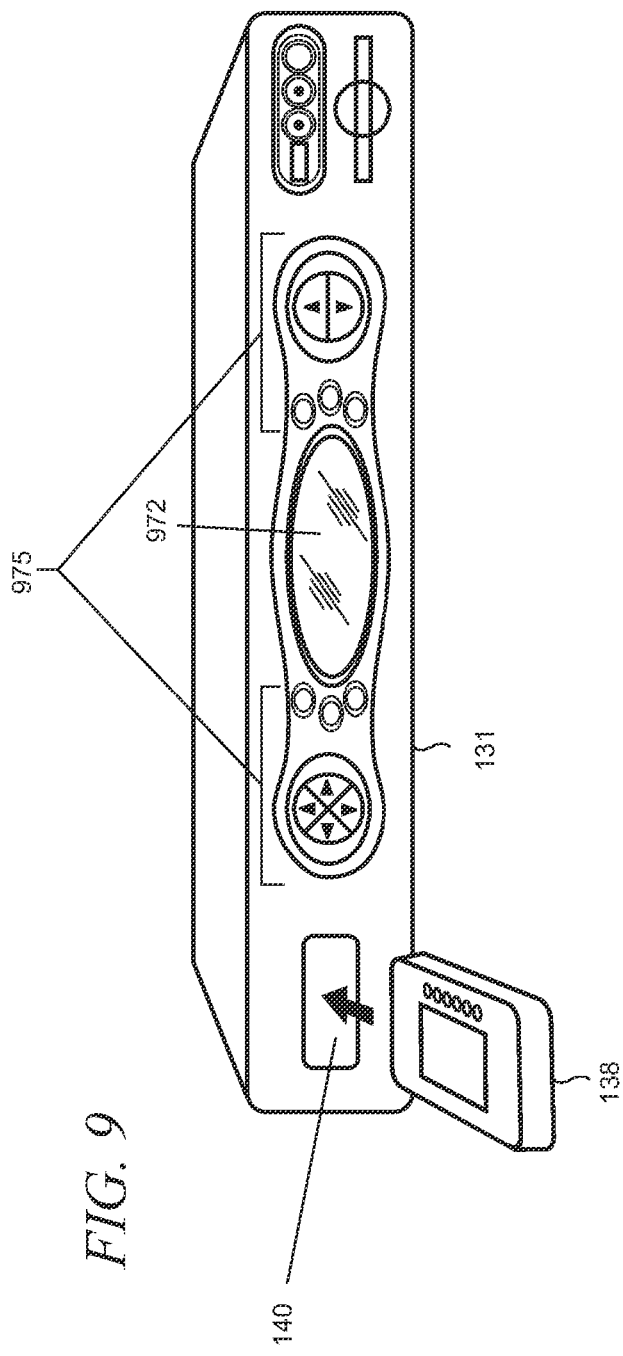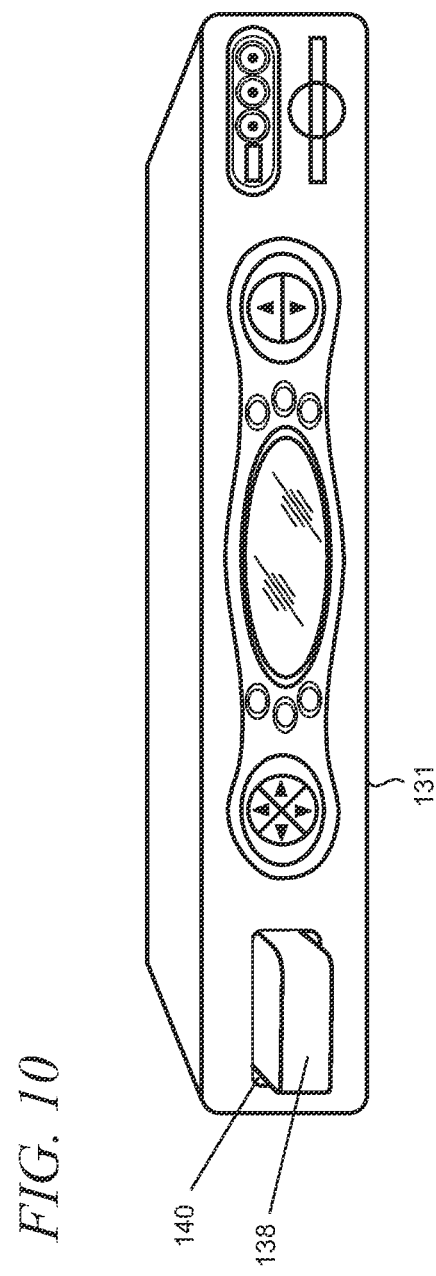

AUTHENTICATION KEY DEVICE HAVING MEDIA CONTENT STORAGE AND RENDERING CAPABILITIES

BACKGROUND

Digital video recorders ("DVRs") have become increasingly popular for the flexibility and capabilities offered to users in selecting and then recording video content such as that provided by cable and satellite television service companies. DVRs are consumer electronics devices that record or save television shows, movies, music, and pictures, for example, (collectively "multimedia") to a hard disk in digital format. Since being introduced in the late 1990s, DVRs have steadily developed additional features and capabilities, such as the ability to record high definition television ("HDTV") programming. DVRs are sometimes referred to as personal video recorders ("PVRs").

DVRs allow the "time shifting" feature (traditionally enabled by a video cassette recorder or "VCR" where programming is recorded for later viewing) to be performed more conveniently, and also allow for special recording capabilities such as pausing live TV, fast forward and fast backward, instant replay of interesting scenes, and skipping advertising and commercials.

DVRs were first marketed as standalone consumer electronic devices. Currently, many satellite and cable service providers are incorporating DVR functionality directly into their set-top-boxes ("STBs"). As consumers become more aware of the flexibility and features offered by DVRs, they tend to consume more multimedia content. Thus, service providers often view DVR uptake by their customers as being desirable to support the sale of profitable services such as video on demand ("VOD") and pay-per-view ("PPV") programming.

A user most often controls a DVR by interacting with a remote control and a guide displayed on a television called an on-screen display ("OSD"). The OSD is typically used to support an electronic programming guide ("EPG") with which menus are provided that allow the user to view a list of programs scheduled for the next few hours up to several days in advance. A typical EPG includes options to set configuration settings and user-preferences, order PPV and VOD programming, search for programs based on theme or category, and select recorded programs for playback, and set recordings for the future.

Once consumers begin using a DVR, the features and functionalities it provides are generally desired throughout the home. To meet this desire, networked DVR functionality has been developed which entails enabling a DVR to be accessed from multiple rooms in a home over a network. Such home networks often employ a single, large capacity DVR that is placed near the main television in the home. A series of smaller companion terminals, which are connected to other televisions, access the networked DVR over the typically existing coaxial cable in the home. These companion terminals enable users to see the DVR output, and to use the full range of DVR controls (pause, rewind, and fast-forward among them) on the remotely located televisions. In some instances, it is possible for example, to watch one DVR-recorded movie in the office while somebody else is watching a different DVR-recorded movie in the family room.

DVR-equipped STBs are often equipped with user-controllable features to restrict access to some recorded content. Such features are generally termed "parental controls" and typically include the capability to filter out, or block content from being played from the DVR in the STB. For example, a user may specify that programming be blocked according to channel, times and dates, title, TV rating, movie rating, and other factors. When enabling parental controls, a user enters a password (commonly, a four digit number) using a menu that is typically provided to access set up, user-preferences or configuration settings. The same password must be entered again at a later time to authenticate a user and provide permission to unblock the restricted content and allow it to be played from the DVR onto a television or other presentation display.

While DVR-equipped STBs generally perform satisfactorily, the simple password-based authentication in common is not very robust, and the password is prone to detection. For example, users often write passwords down to avoid forgetting them and may store them next to the STB. Or, a person may gain access to the password by looking over the shoulder of a user who is entering it.

In addition to gaining more secure implementation of parental control and program blocking features, users are increasingly desiring to gain flexibility beyond that provided by networked DVRs in order to have more choices as to where and when DVR-recorded content may be consumed.

DESCRIPTION OF THE DRAWINGS

FIG. 6 is a diagram of an illustrative device and accessory connector arrangement used to connect an authentication key to an STB;

FIG. 7 shows front views of the connectors shown in FIG. 6;

FIG. 8 shows a cutaway view of an accessory connector disposed within the body of the authentication key;

FIG. 9 is a pictorial representation of an illustrative STB having an authentication key receiving bay with an opening in the front;

FIG. 10 is a pictorial representation of an illustrative STB having an authentication key receiving bay with an opening in the front with an authentication key inserted therethrough;

DETAILED DESCRIPTION

An arrangement is provided in which an authentication key with media content and storage capabilities is configured as a removable module that interoperates with an STB to enable two-factor authentication to be implemented when authenticating a user to unblock media content recorded by a digital video recorder that is designated for restricted access using, for example, parental control or blocking features provided by the STB. Two-factor authentication is an authentication protocol that requires two independent ways to establish identity and privileges. Two-factor authentication provides improved authentication security compared to the one-factor authentication that relies only on a static password.

Implementations of two-factor authentication use "something you know" as one factor and "something you have" (i.e., a physical device) as the other factor. In the present arrangement, a user-selected password is one factor and the authentication key is the other factor. Thus, in order to be granted access to the blocked media content unblock blocked media content such as a recorded movie or television program, a user must be able to present each of the two factors in order to be: 1) possession of the authentication key which is docked with the STB; and 2) knowledge of the correct password. When the authentication key is removed (i.e., undocked) from the STB, the STB will not allow access to the blocked media content even if the correct password is entered.

The authentication key is also arranged with a memory to record media content that is accessed using the STB. The STB thus functions as an intermediary, or "proxy" device, to facilitate selecting, receiving, and recording media content onto the authentication key from a distribution network. Such distribution networks include broadband multimedia distribution systems such as cable or satellite television networks. The authentication key is also configured with an onboard video processor that enables the authentication key to perform as a portable media player that can drive, in various illustrative examples, a built-in display device or external presentation devices such as television or monitors.

In other illustrative examples, an STB is arranged with one or more integrated docking stations, or bays, to receive one or more authentication keys.

Figure 1:
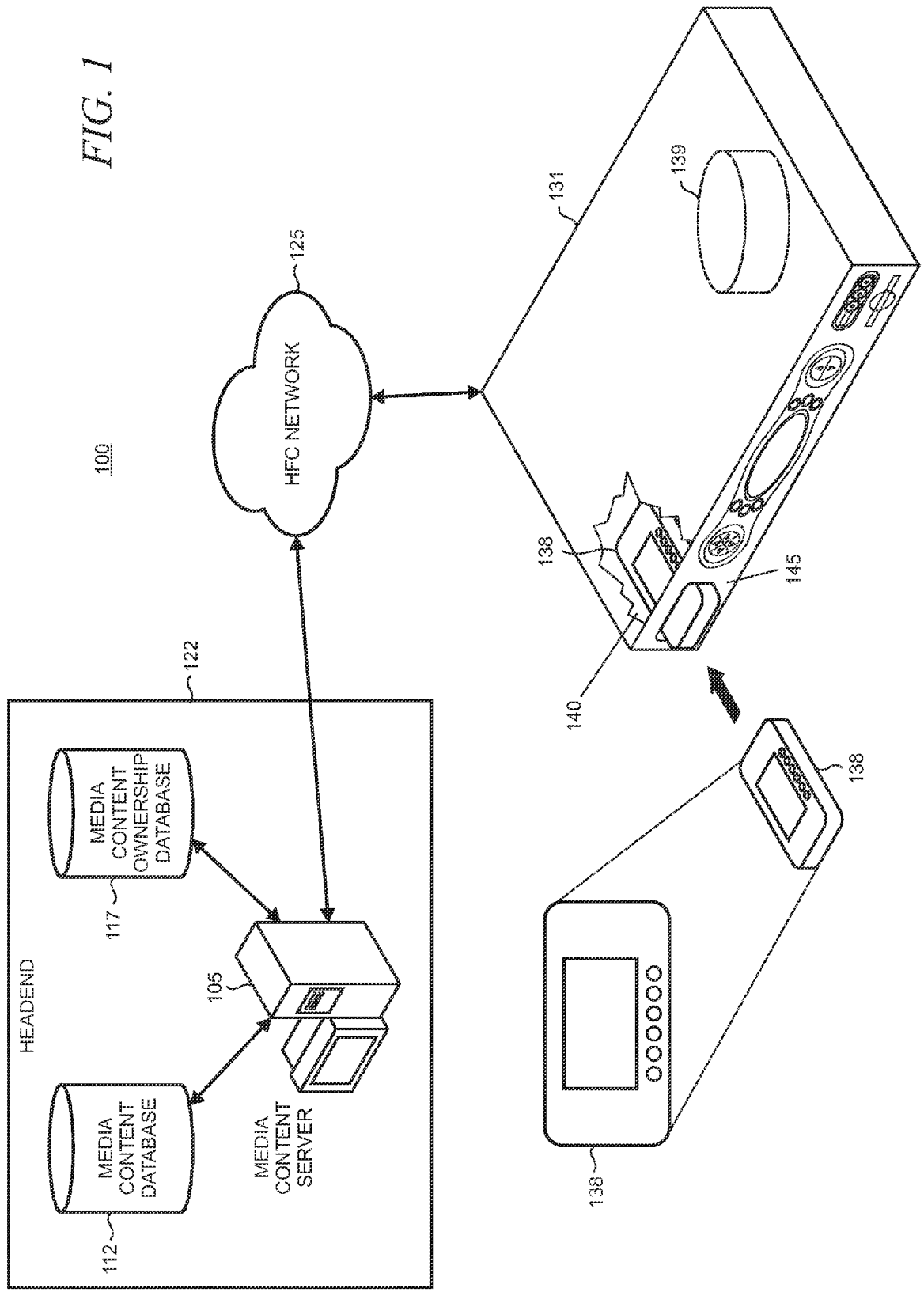
FIG. 1 is a diagram of an illustrative media distribution architecture including a media content server, two databases, a distribution network, a set-top box ("STB"), and an authentication key having media content storage and rendering capabilities.

Turning now to the drawings where like reference numerals indicate like elements, FIG. 1 is a diagram of an illustrative media distribution architecture 100 including a media content server 105, a media content database 112, a media content ownership database 117, a distribution network 125, an STB 131, and an authentication key having media content storage and rendering capabilities 138 (hereinafter referred to as simply the "authentication key" for convenience).

Distribution network 125 in this illustrative example is a hybrid fiber-coax ("HFC") network in which optical fiber cable and coaxial cable are used in different portions of a network to carry broadband content including media content. HFC networks are commonly used to distribute cable television and broadband data services to terminal devices such as STBs located in homes and businesses. Data and media content provided by such services are typically encrypted and encoded using a conditional access system (not shown) and then decrypted and decoded by authorized terminal devices.

The media content server 105 is coupled to the distribution network 125. Media content server 105 is typically disposed at the headend of an HFC network. Media content server 105 is arranged to serve media content to the STB 131 over the distribution network 125 typically as an MEPG-2 (Moving Pictures Expert Group) encoded DTV (Digital Television) stream. The media content served by the media content server 105 is stored in a coupled media content database 112. A media content ownership database 117 is also coupled to the media content server 105. Media content ownership database 117 is an example of a business system database that is used to associate and track orders, subscriptions, and other data from a consumer with the media content stored on media content database 112. In this illustrative example, media content server 105, media content database 112, and media content ownership database 117 are disposed at a common headend 122. In alternative arrangements, databases 112 and 117 may be remotely located from media content server 105 and accessed via a connection selected from one of network link, satellite link, or fiber-optic link (not shown). The structures shown in headend 122 along with distribution network 125 are typically employed by a service provider or operator such as an MSO (multiple system operator) that has cable entertainment systems in multiple locations.

STB 131 is one example of a terminal device among a plurality of other such devices (not shown) on distribution network 125 that is arranged to receive media content typically by tuning to selected media content contained in a broadband signal sent from media content server 105. For example, a cable television/broadband service consumer typically purchases a subscription that entitles the subscriber to select and consume programming from a set variety of channels. The selected media content can then be rendered (i.e., decrypted and decoded as required) onto a coupled presentation device such as a television or monitor. Such selected media content is also optionally recordable to an internally disposed DVR 139 in STB 131 (shown in phantom view in FIG. 1), to a DVR in the authentication key 138, or a combination of both as described in more detail below.

In addition to media content that is selectively tuned from the broadband signal from media content server 105 and then rendered or recorded, STB 131 is arranged in this illustrative example so that the consumer may select and receive specially ordered programming that typically falls outside programming choices provided by the channels in the subscription. Such specially ordered programming includes video-on-demand ("VOD") and Pay-per-View ("PPV") programming. Both VOD and PPV programming may require a separate purchase by the consumer to receive and consume the selections where the purchase price is normally added to the regular subscription cost. In some applications, a separate VOD and/or PPV content server is used. However, in the present illustrative example media content server 105 is arranged to serve both regular subscription and specially ordered (e.g., VOD and PPV) programming to STB 131.

An EPG is typically hosted by STB 131 allowing a user to navigate, select, and discover available media content by time, title, channel, genre, etc., typically by interacting with the EPG using a remote control (not shown).

Figure 14:
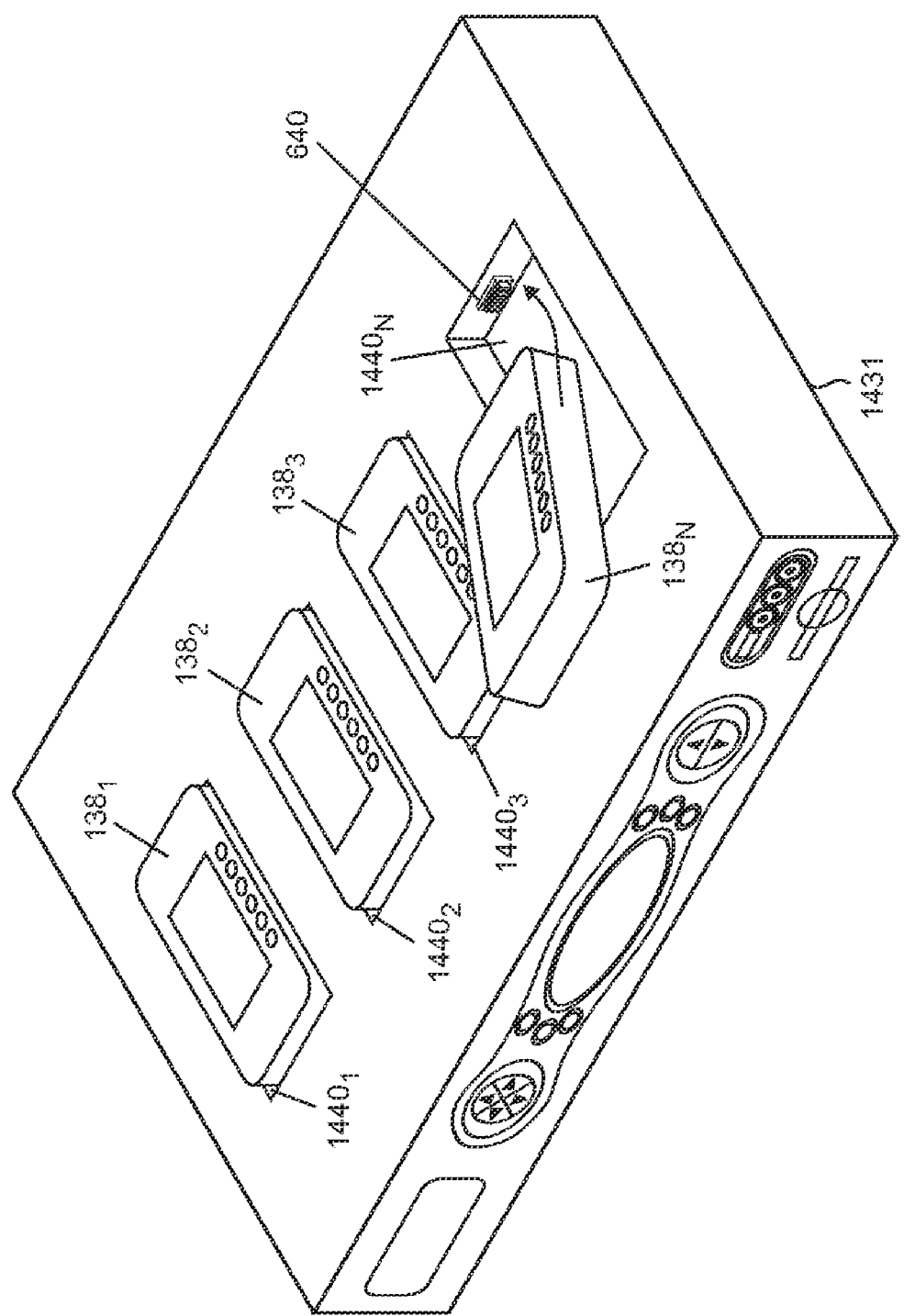
FIG. 14 is a pictorial representation of an illustrative set top box that has multiple authentication key receiving bays disposed in its top panel.

Authentication key 138 is a discretely embodied device that is arranged to interoperate with STB 131 as a removably engagable module. In this illustrative example, authentication key 138 may be placed into an authentication key receiving bay 140 (i.e., a "docking" bay) that is internally disposed in STB 131 and which has an opening in the front panel 145 of STB 131. FIG. 1 shows two views of authentication key 138: one view showing authentication key 138 outside the STB 131 in an undocked state; the second view showing the authentication key 138 docked in the receiving bay 140 in a cutaway view. Other docking arrangements are shown in FIG. 14 and described in the accompanying text.

Authentication key 138 is generally desired to be arranged having a small form factor. Although the specific dimensions and memory capacity selected are design choices made in response to specific requirements, generally authentication key 138 is sized to be readily portable and may be sized as a handheld device in some implementations as shown in the drawings. However, other form factors are also contemplated being usable. For example, a physically larger device may include a high capacity DVR which may be desirable in some scenarios.

When docked with STB 131, authentication key 138 receives media content from STB 131 which is recorded on an internally disposed memory such as a hard disk or solid state memory to thus enable authentication key 138 to function as a discretely embodied DVR. Such DVR functionality provided by the authentication key 138 is typically used as the sole recording medium for the STB 131. Such arrangement can provide several advantages which include giving users the ability to have their entire library of recorded media content stored on a portable device which can be consumed anywhere a television is located, or by watching recorded programs on the built-in display. In addition, by having their library stored in a removable module, users may conveniently store the authentication key 138 in a secure location (e.g., in a locked drawer) when not in use to ensure that the media content recorded on it can not be watched.

However, in some applications of the present authentication key arrangement the STB 131 will have its own integrated DVR and the DVR functionality provided by the authentication key 138 will be used to complement the capabilities of the DVR-equipped STB. For example, it may be desirable to record only media content having restricted access to the authentication key 138 to thus utilize its robust authentication, while recording non-restricted media content to the DVR-equipped STB. Alternatively, the authentication key 138 may be used simply to provide additional DVR recording capacity.

Figure 2:
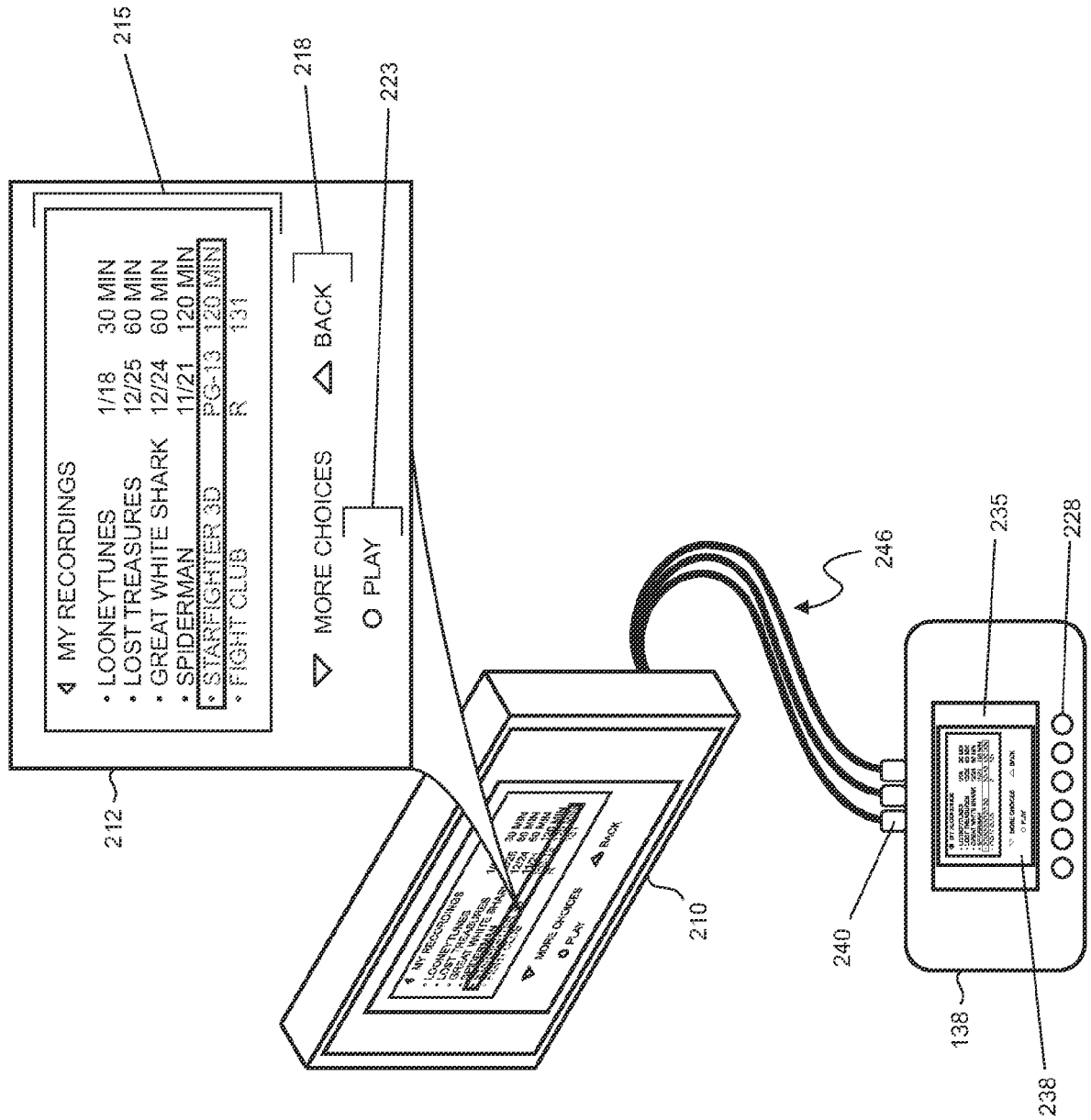
FIG. 2 is a pictorial view of the authentication key when undocked from an STB and coupled to a presentation device such as a television.

FIG. 2 is a pictorial view of authentication key 138 when undocked from STB 131 (FIG. 1). Authentication key 138 is coupled to a presentation device, such as television 210 on which is displayed an illustrative graphical user interface ("GUI") screen shot 212 that are provided by an application hosted by authentication key 138. In an illustrative example, the functionality provided by the GUI application is similar to that provided by an EPG used by an STB.

As shown in FIG. 2, screen 212 shows a number of choices in a menu 215 of media content that is recorded on the authentication key 138 and accessible by the user. Additional media content choices are available on menu 215 using scroll buttons 218. A particular menu choice is played on the television using the play button 223. Screen 212 is representative of a plurality of screens that are generally utilized to create hierarchical menus which facilitate browsing and selection of media content to be played on the coupled television 210. Other menus may be alternatively and/or optionally utilized to enable setting of preferences, adjust video or device settings, and the like. The user typically utilizes controls 228 on authentication key 138 to facilitate interaction with the displayed screens and menus. A remote control (not shown) is also usable to supplement or replace controls 228 in alternative arrangements.

Controls 228 include various functionalities (e.g., buttons, and scrolling, pointing, and selection devices, etc.) that enable a user to navigate through menus in order to browse and select media content for viewing. A built-in display screen 235 is also typically provided for most applications and may comprise, for example, an LCD (liquid crystal display). Display screen 235 is also normally arranged to show an EPG-type user interface 238 that is similar to that displayed on the coupled television 210, as shown. Display screen 235 may be utilized to provide information to the user such as battery status (when an internal battery is utilized) or fault/trouble-shooting codes in the event that the external presentation device is unable to be driven by the authentication key 138, for example.

Authentication key 138 uses one or more connectors (collectively identified by reference numeral 240 in FIG. 2) to which connecting cables are coupled to enable recorded media content to be rendered on the television 210. In this particular illustrative example of an authentication key, as shown in FIG. 2, a single composite video and two connectors for audio (typically left and right stereo channels) are employed which are disposed at the top of the device and three cables (collectively identified by reference numeral 246) are utilized to couple the device to corresponding input connectors in the television 210.

While authentication key 138 is removably integrated with the STB 131 (FIG. 1), it is further optionally configurable to be physically coupled to an STB 131 using a cable connecting arrangement (not shown). Such arrangements may be selected as conforming with one of a variety of high bandwidth bus protocols including, for example, USB (Universal Serial Bus) USB-2, IEEE-1394 (Institute of Electrical and Electronics Engineers), serial, parallel, SCSI (Small Computer System Interface) and the like. In an alternative embodiment, a wireless communication protocol may be used to supplement or replace the cable connecting arrangement. Such wireless communication protocols include, for example, IEEE 802.11, Bluetooth or Zigbee.

Figure 3:
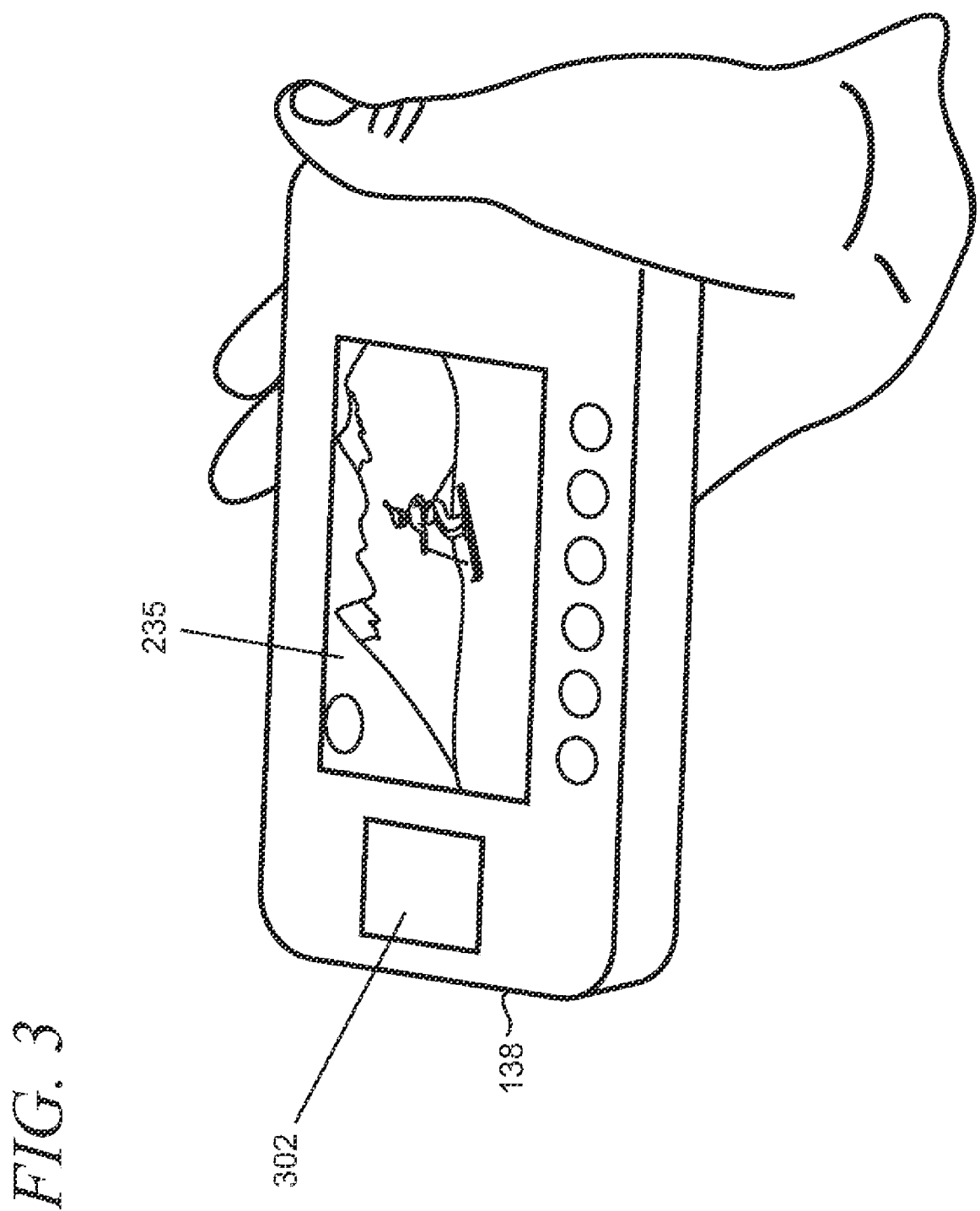
FIG. 3 shows the authentication key being used in a standalone operational mode where recorded media content in memory is rendered onto its built-in display screen.

FIG. 3 shows the authentication key 138 being used in a standalone operational mode where recorded media content in memory is rendered onto its built-in display screen 235. In this mode of operation, it is generally desirable for the authentication key to be configured to run on battery power to enable a high degree of flexibility in how and where media content may be consumed. However, battery powered capability is not required in all applications. Although the standalone operation does not support a two-factor authentication process to be utilized to unblock any recorded media content, the authentication key 138 may still be arranged with password protection. Thus, security equivalent to the current one-factor authentication protocol used in most current parental control and content-blocking/filtering schemes is provided when authentication key 138 is used in standalone mode.

FIG. 3 also shows a biometric reader 302. Biometric reader 302 is optionally utilized to generate a password that is used to replace or supplement a character-based password that is input at a user interface. In this illustrative, example biometric input device is configured as a fingerprint reader.

Figure 4:
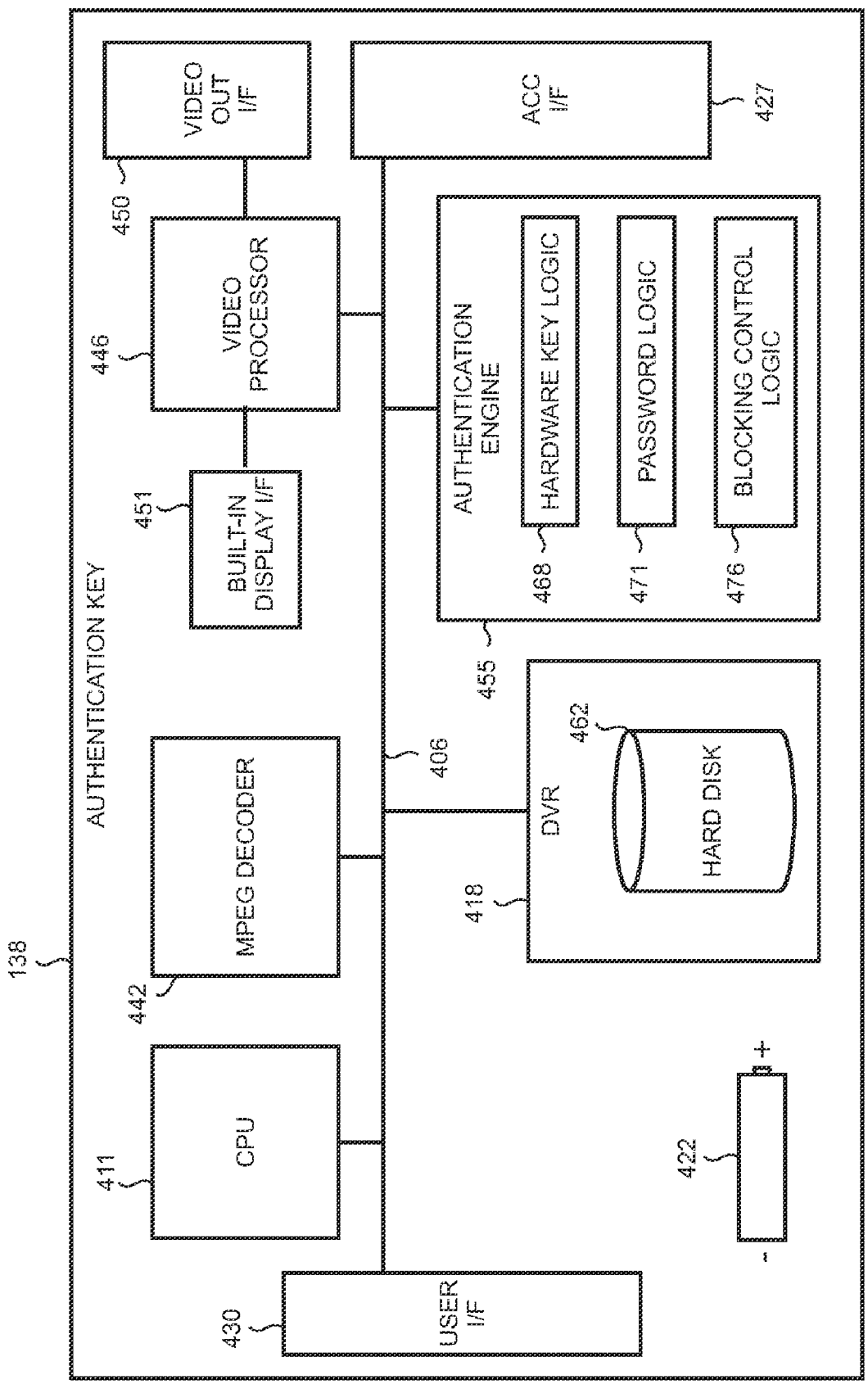
FIG. 4 is a simplified functional block diagram of an illustrative authentication key.

FIG. 4 is a simplified functional block diagram of the illustrative authentication key 138 shown in FIG. 1. A central bus 406 is utilized to couple a number of components including a CPU 411, DVR 418, accessory interface 427, user interface 430, MPEG decoder 442, video processor 446 (having a coupled video output interface 450, and a coupled built-in display interface 451), and an authentication engine 455. DVR 418 includes a memory, such as a hard disk 462 that may be shared to support various functionalities in authentication key 138. For example, applications, instructions, and other code that are executed by CPU 411 are storable in such memory. Other suitable memory types include solid state memory such as random access memory ("RAM") or Flash RAM-type memory structures. A battery system 422 and associated power management (not shown) is optionally provided in authentication key 138 to enhance media content consumption in standalone mode as described above in the text accompanying FIG. 3. Battery system 422 is alternatively configurable using replaceable or rechargeable batteries. When configured as a rechargeable system, battery system 422 is typically recharged when the authentication key 138 is docked with STB 131.

Accessory interface 427 provides connectivity between the authentication key 138 and an STB (e.g., STB 131 in FIG. 1) in order to receive media content from the STB. Accessory interface 427 is alternatively configurable with a physical interface that uses a cable type connection between the authentication key 138 and the STB 131, or uses a connector pair arrangement shown in FIGS. 6 and 7 for a docking-type connection. User interface 430 is typically utilized with a coupled display (e.g., a television) or the display screen 235 built into authentication key 138 to provide the EPG-type menus illustratively shown in FIG. 2.

In this illustrative example, MPEG decoder 442 decodes the encoded media content received over the accessory interface 427. In some applications, MPEG decoder 442 (or a separate device) also decrypts the media content when encryption is used in the DTV stream. Video processor 446 processes the decoded MPEG stream to thereby render it on an external presentation device, such as a television or monitor that is coupled to the video output interface 450. In some applications of the present authentication key arrangement, the video processor 446 and MPEG decoder 442 are integrated into a single device. Video processor 446 is typically arranged to provide an output video signal that is alternatively transmittable using one or more of a variety of different resolutions, formats, and protocols.

Accordingly, connectors 240 (FIG. 2) used with the video output interface 450 may be selected from one or more of an RF (radio frequency) connector for coaxial cable, an S video connector, an optical S/PDIF (Sony-Philips Digital Interface Format) connector, component video connectors using RCA-type jacks (referred to as "Y," "$P_b$," and "$P_r$" for the luminance, blue, and red chroma components in analog and "Y," "$C_b$," and "$C_r$" in digital applications), an RGB (red/green/blue) video connectors using an RCA-type jack, a regular (i.e., non-optical) S/PDIF connector using an RCA-type jack, audio inputs and outputs using RCA-type jacks, a USB connector, an Ethernet connector, an HDMI (High-Definition Multimedia Interface) connector, a DVI (Digital Visual Interface) connector, an Ethernet connector, and a IEEE-1394 connector.

Authentication engine 455 includes hardware key logic 468, password logic 471 and media content blocking logic 476. It is noted that authentication engine 455 may be implemented as a discretely embodied subsystem in the authentication key 138, or alternatively is arrangeable as a logical structure that is implemented using software instructions stored in memory that are executed by CPU 411. Another embodiment of authentication engine 455 comprises a combination of physical structure and software.

Hardware key logic 468 is arranged to enable the STB 131 to determine the presence or absence of the docked authentication key 138. As noted above, the physical hardware that is used to embody the authentication key 138 provides the first factor used in the present two-factor authentication. In one illustrative example, hardware key logic 468 works with corresponding logic disposed in the STB 131 to exchange a code when docked. Thus, when a user docks the authentication key 138 to STB 131 to enable parental controls on STB 131, hardware key logic 468 initiates the passing of a code to STB 131. Such code may include a hardware serial number, unit ID, MAC address, ID number or a randomly generated number, hash value of such codes, or combinations thereof, for example. The code is retained in non-volatile memories in both the STB 131 and authentication key 138 under the control of the respective hardware key logics so that the STB 131 and authentication key 138 can continue to recognize each other after the authentication key 138 is undocked and then re-docked from STB 131 over time.

After docking the authentication key 138 with STB 131, password logic 471 initiates a prompt for the user to input the parental control password via a user interface that is typically hosted by the STB with an on-screen display on a coupled television. In alternative implementations, the password user interface is hosted by the authentication key 138 using either its built in display or using an on-screen display. A non-character based password is also usable in some applications, for example, a biometric input using biometric reader 302 (FIG. 3). The user-password is passed to the password logic 471 which initiates storage of the password in non-volatile memory.

Content blocking control logic 476 is arranged to track, and initiate storage into non-volatile memory of the parental control settings input by the user for content that is recorded by the DVR 418 and stored on hard disk 462. The content blocking control logic 476 also generates block and/or unblock commands responsive to the parental control settings that are passed to STB 131 to be implemented by content media blocking implementation logic disposed therein.

As described below in the text accompanying FIG. 5, content block logic 476 is also usable to apply the parental controls settings to media content that is stored on the optionally-utilized internal DVR 139 in STB 131.

When the authentication key 138 is undocked from STB 131 after the parental controls are enabled and set, recorded media content that is subject to restrictions imposed by the parental controls is blocked from being rendered by the STB 131 since the first factor (i.e., verification of presence of the hardware key embodied by the authentication key 138) in the two-factor authentication process is not present. At a later time when the authentication key 138 is re-docked with the STB 131, hardware key logic 468 reconfirms the code with the corresponding logic disposed in STB 131 to verify the first factor in the two-factor authentication.

Password logic 471 initiates a prompt for the user to input the parental control password via the user interface when media content subject to the parental control restrictions is attempted to be accessed. If the input password matches the stored password, then content blocking control logic 476 generates an unblock command that is passed to STB 131 to be implemented by the blocking implementation logic. If the input password does not match the stored password, then content blocking logic 476 operates with the STB's blocking implementation logic to prevent the restricted media content from being rendered by STB 131.

Figure 5:
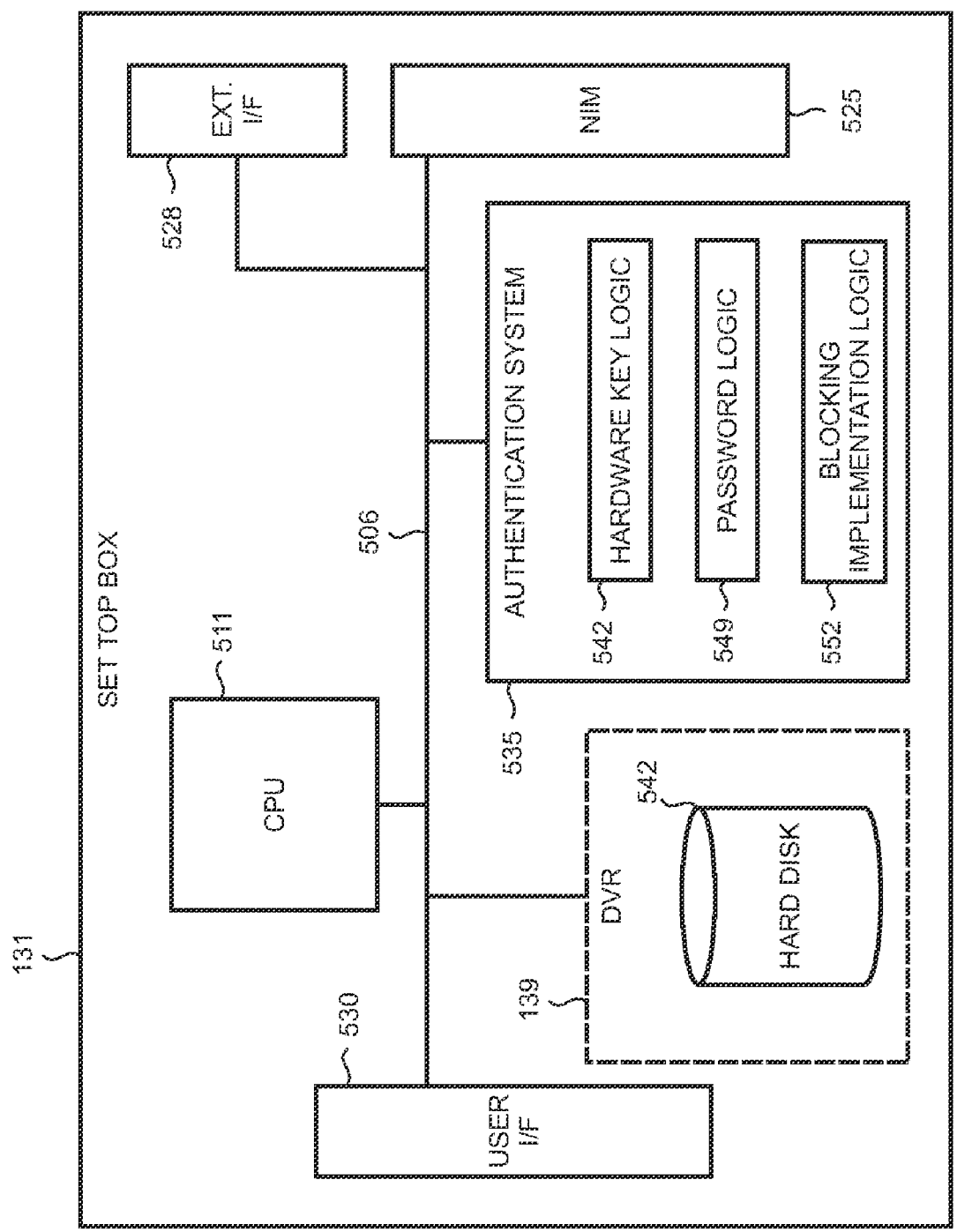
FIG. 5 is a simplified functional block diagram of an illustrative STB.

FIG. 5 is a simplified functional block diagram of the illustrative STB 131 shown in FIG. 1. A central bus 506 is utilized to couple a number of components including a central processing unit ("CPU") 511, optionally-utilized DVR 139, network interface module ("NIM") 525, external device interface 528, user interface 530 and authentication system 535. DVR 139 includes a memory, such as hard disk 542 as shown. In some arrangements, the memory is shared with other STB functionalities, for example, for storing STB applications (such as an EPG application) and associated data, code or other instructions that are executed by the CPU 511 as required to provide a normal STB feature set. As noted above in the text accompanying FIG. 1, DVR 139 is optionally used (as indicated by the dashed rectangle in FIG. 5) since the authentication key 138 is configured to be capable of providing sufficient DVR functionality in most applications.

NIM 525 is utilized as an interface to a media content distribution network, such as HFC network 125 in FIG. 1, to receive media content from a service provider such as an MSO. External device interface 528 provides connectivity between the STB 131 and external devices including, for example, the authentication key 138 shown in FIG. 1. External device interface 528 is alternatively configurable with a physical interface that uses a cable type connection between the STB 131 and the authentication key 138, or uses the connector pair arrangement 600 shown in FIGS. 6 and 7 for a docking-type connection. User interface 530 is typically utilized with a coupled display (e.g., a television) to provide the EPG-type menus.

Authentication system 535 includes hardware key verification logic 542, password logic 549, and media content blocking implementation logic 552. It is noted that authentication system 535 may be implemented as a discretely embodied subsystem in STB 131, or alternatively is arrangeable as a logical structure that is implemented using software instructions stored in memory that are executed by CPU 511. Another embodiment of authentication system 535 comprises a combination of physical structure and software. Authentication system 535 may also be incorporated as part of a conditional access system (not shown) that may be included in STB 131 in some applications.

Hardware logic 542 enables the STB 131 to recognize the presence of the docked authentication key 138. As noted above, hardware logic 542 interoperates with the corresponding hardware key logic 468 in authentication key 138 by exchanging a code that enables the devices to continue to recognize each other as the authentication key 138 is docked, undocked, and re-docked.

Password logic 549 is arranged to interoperate with the corresponding password logic in authentication key 138. Password logic 549 responsively generates prompts and receives a user-password from the user interface when parental controls are initially enabled, and later as access to restricted media content is sought for rendering by STB 131.

Media content blocking implementation logic 552 is arranged to interoperate with the corresponding media content blocking control logic in authentication key 138. Media content blocking implementation logic 552 is thus arranged to implement the block and/or unblock commands from the control logic in authentication key 138 responsively to the applicable parental control settings set by the user.

As shown in FIGS. 6 and 7, a connector pair 600 is utilized to enable the authentication key 138 to be operatively docked to the STB as shown in FIG. 1. The connector arrangement 600 comprises two mating connectors. An accessory connector 620 has a circuit end 622 that is arranged to be coupled to electrical circuits in the authentication key 138, including for example, battery system 422 (FIG. 4) and/or I/O (input/output) control circuitry. Accessory connector 620 has mating end 624 that is arranged to mate with a corresponding device connector 640. Device connector 640 has a mating end 644 and a circuit end 642 that are arranged to be coupled to electrical circuitry in the STB 131, including for example an I/O interface in the STB 131.

The connector arrangement 600 used to connect authentication key 138 and STB 131 may be widely varied. Thus, the physical form factor, connector count, and configuration of the connector arrangement 600 are typically a matter of design choice for the specific application involved. However, in this illustrative example, connector arrangement 600 includes both power and data contacts. Accessory connector 620 includes a set of contacts 626 which are arranged to engage with corresponding and mating contacts 646 in device connector 640. Accordingly, individual contacts in contact set 626 of accessory connector 620 used for power transmission are operatively coupled to battery circuitry in the authentication key 138. Individual contacts in contact set 626 used for data transmission are operatively coupled to the authentication key's I/O controller circuitry. In addition, then, the power and data contacts in contact set 626 are configured to engage with corresponding contacts in contact set 646 in device connector 640 so as to provide operational or charging power and data transmission between the authentication key 138 and STB 131 when the connectors 620 and 640 are mateably engaged.

In the illustrative example shown in FIGS. 6 and 7, the contact set 646 in device connector 640 protrude for insertion into the corresponding contacts 626 that are recessed within connector 620 (i.e., a "male" to "female" connection). In some applications, contact set 646 and connector 640 are arranged to snugly fit (i.e., a "friction-fit") with contact set 626 and connector 620 to hold the connector arrangement 600 together. Alternatively, connectors 620 and 640 may include a locking mechanism for positively locking the connectors together. For example, a latch on a portion of one connector that engages and disengages with a portion of the other connector may be used in some applications.

The arrangement of contacts in connector arrangement 600 may also be widely varied. For example, data transmission functionalities including USB, USB 2, IEEE-1394 and other data transmission standards are selected to meet specific requirements. Functionalities may be mixed and combined as well in some applications so that some contacts in the contact sets are dedicated to USB signals while others are dedicated to IEEE-1394 signals. Conventional signals including grounding, charging, powering, signaling protocols, device or accessory identification, and similar signals may also be carried across the contact sets. Accordingly, the number of contacts and their physical configuration will typically vary according to the specific requirements of an application.

FIG. 8 shows a cutaway view of an accessory connector 620 that is disposed within the body of the authentication key 138. The accessory connector in this example is positioned in the body so that the circuit end 622 is available to circuitry contained internally within the authentication key 138. The mating end 624 is positioned so that it is exposed on an external surface (in this example, the side portion of the authentication key 138) to thereby facilitate mateable engagement with a respective corresponding device connector.

FIG. 9 is a simplified pictorial view of the STB 131 having an authentication key receiving bay 140 that is substantially disposed within the interior housing of STB 900 and having an opening in the front surface (i.e., front panel) of the STB 131. The authentication key receiving bay 140 is configured to physically receive the authentication key 138. That is, authentication key 138 may be inserted into the receiving bay 140 to thereby operatively dock with the STB 131 as shown in FIG. 10. STB 131 includes a front panel display 972 and a number of controls 975, as shown.

Figure 11:
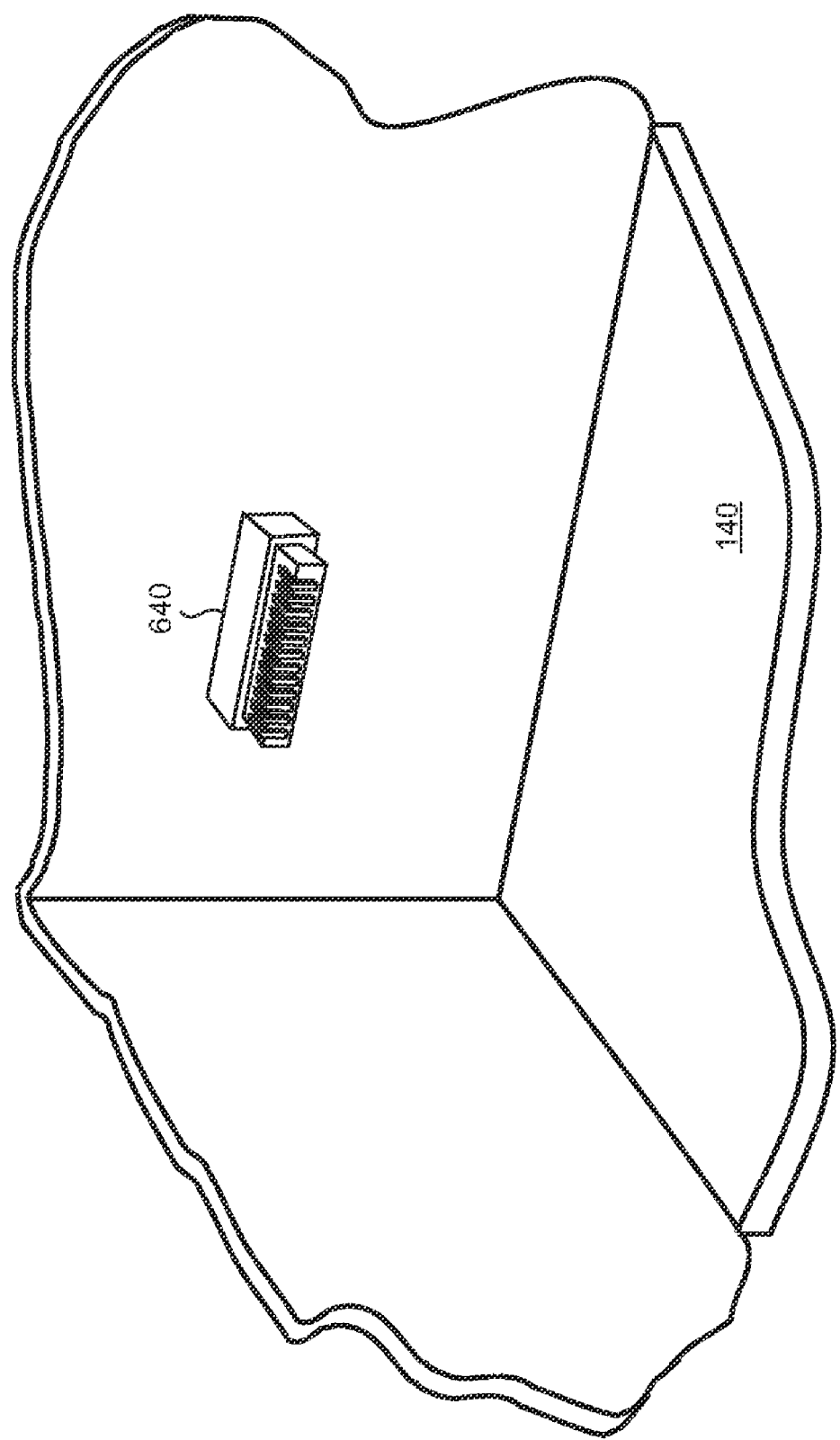
FIG. 11 shows an enlarged interior perspective view of an illustrative authentication key receiving bay.

Authentication key receiving bay 140 includes the device connector 640 as shown in FIGS. 6 and 7 and described in the accompanying text. FIG. 11 is an enlarged interior perspective view of the authentication key receiving bay 140 which is disposed in STB 131 showing device connector 640 disposed on the rear end portion of the receiving bay 140 which is spaced apart from and opposes the authentication key receiving bay opening (not shown). Device connector 640 is typically operatively coupled to various components, for example an I/O interface, in the STB 131 as described below.

Figure 12:
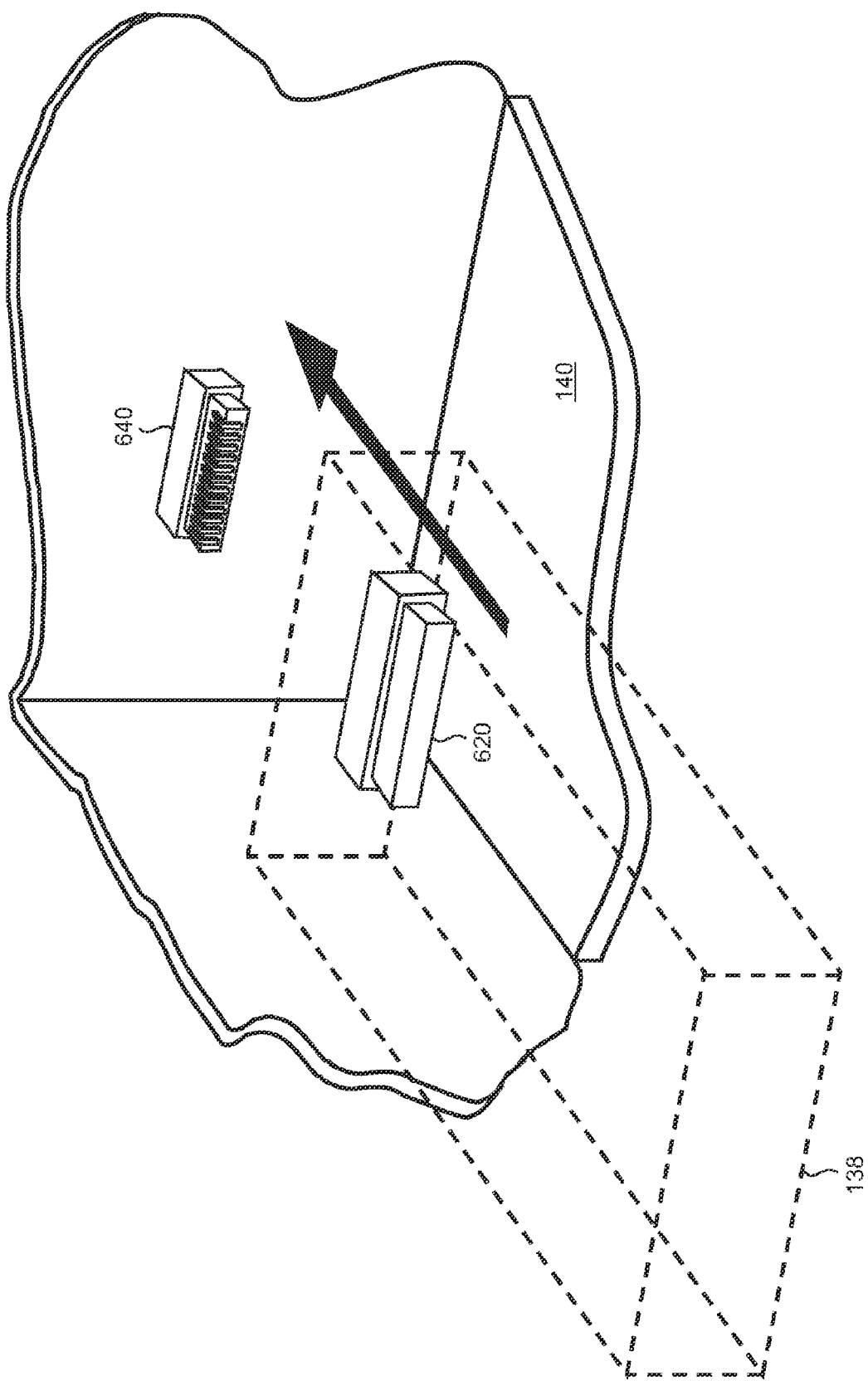
FIG. 12 shows an enlarged interior perspective view of an illustrative authentication key receiving bay showing the connectors in an operative relationship before being mateably engaged.
Figure 13:
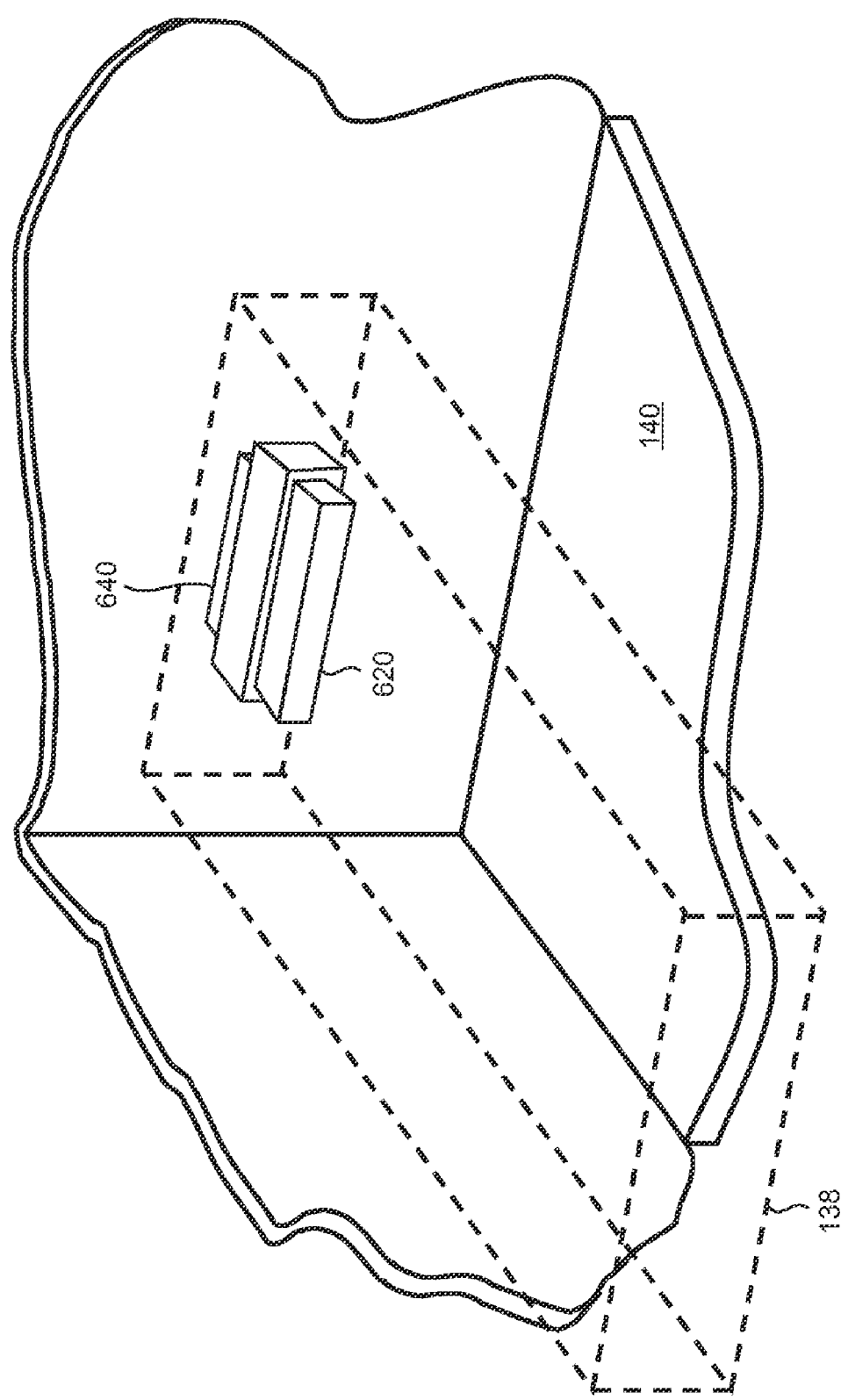
FIG. 13 shows an enlarged interior perspective view of an illustrative authentication key receiving bay showing the connectors in an operative relationship after being mateably engaged.

As illustrated in FIG. 12, authentication key 138 (shown in phantom lines only for sake of clarity in illustration) having the accessory connector 620 disposed along its side surface is inserted through the opening in the front panel of the STB 131. Authentication key 138 is pushed rearwardly into the receiving bay 140 until the accessory connector 620 is operatively received and mateably engaged with the device connector 640 as shown in FIG. 13.

Optionally, STB 131 is arranged with a visual or audible indicator, for example a light or buzzer respectively, to signal to a user that a positive operative connection was made between the authentication key 138 and STB 131. Such a signal can be helpful positive feedback to the user that the STB "sees" the authentication key 138 (i.e., recognizes that it is connected to the STB) particularly as the device connector 640 is not always located in a position that is easily visible to the user in every application. In addition to a discrete indicator on the STB 131, existing visual or audible indicating devices in the STB 131 are alternatively used, for example the panel display 972, or an internal speaker if the STB 131 is so equipped. In other applications, the STB 131 is arranged to display connection status with a docked authentication key 138 through a user interface such as EPG displayed on a coupled television. Optionally, the STB 131 and authentication key 138 may be arranged so that the authentication key 138 displays a message or icon on its display screen 235 (FIG. 2) which indicates that a positive docking connection has been accomplished.

While FIG. 9 shows a receiving bay 140 having an opening that is disposed on the front panel of the STB 131, other configurations for the receiving bay are contemplated as being usable depending on the requirements of a specific application. For example, the receiving bay may be alternatively disposed for access from the top or side of the STB 131. In addition, the authentication key 138 and STB 131 are arrangeable in various types of "piggyback" structures where the authentication key 138 is operatively attached, for example, to a top, front, or side panel of the STB using an appropriate connector or set of connectors.

FIG. 14 shows multiple authentication keys $138_{1-N}$ that dock into respective receiving bays $1440_{1-N}$ disposed on the top panel of an illustrative STB 1431. STB 1431 is arranged with similar features and functions as STB 131 shown in FIG. 1 and described in the accompanying text. This multiple authentication key arrangement uses the connector pair arrangement 600 (FIGS. 6 and 7) to implement the operative connection between the authentication key 138 and STB 1431. A representative device connector 640 is shown in FIG. 14.

The arrangement of FIG. 14 advantageously enables, for example, different family members to record and restrict access to media content on an individual basis. Settings and user preferences may also be individualized using the present authentication key arrangement.

Figure 15:
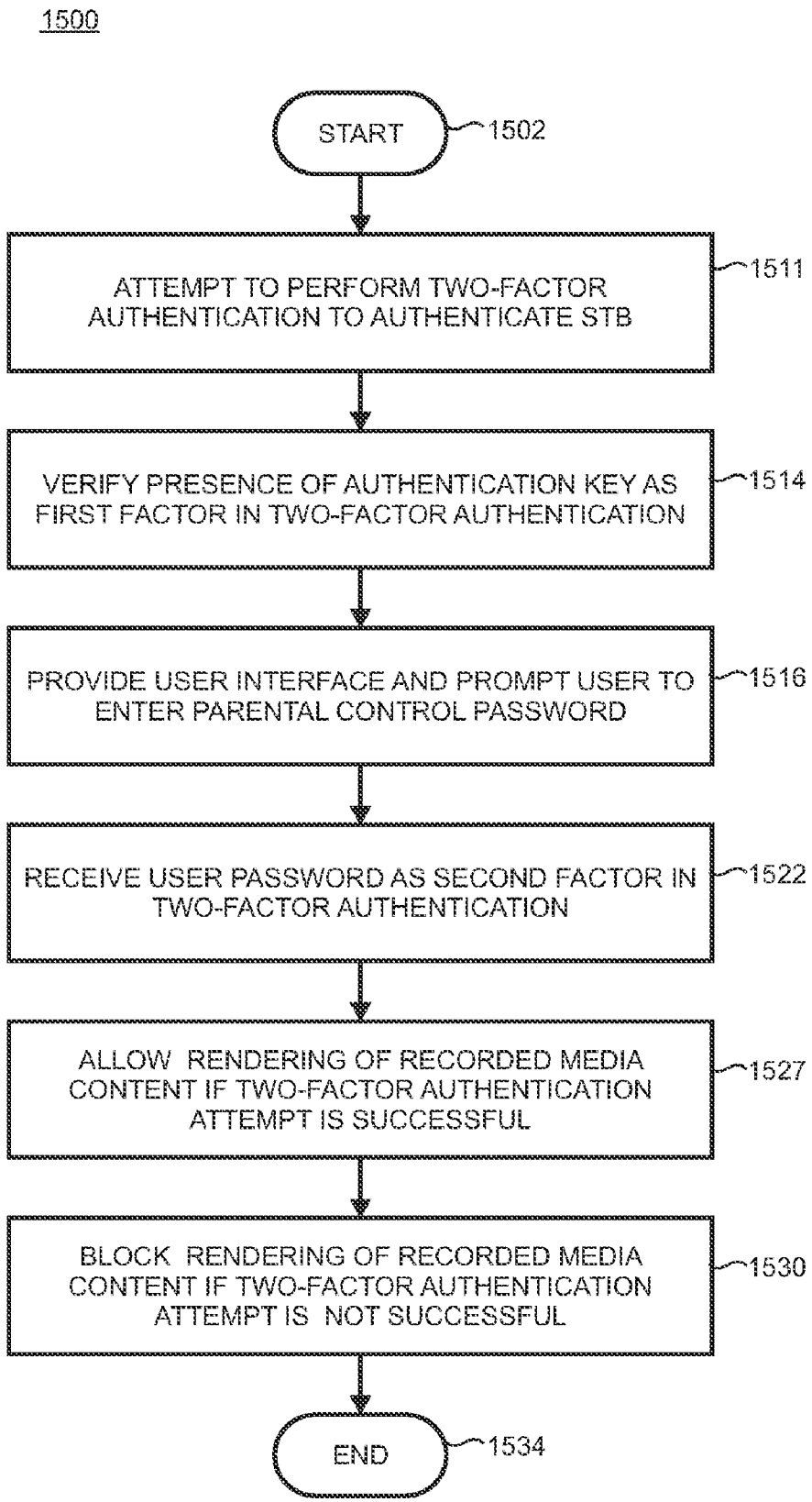
FIG. 15 is a flowchart of an illustrative method for performing two-factor authentication to authenticate an STB as required to unblock restricted media content for playback by the STB.

FIG. 15 is a flowchart of an illustrative method 1500 for performing two-factor authentication to authenticate an STB (e.g., STB 131 in FIG. 1) as required to unblock restricted media content for playback by the STB. Such restricted media may be recorded on either STB 131 or authentication key 138.

The method starts at block 1502. At block 1511, a two-factor authentication process is attempted. The presence of a physical authentication key, such as authentication key 138 (FIG. 1) is verified as the first factor in the two-factor authentication process as indicated at block 1514. As noted in the text accompanying FIG. 5, such verification can include the transfer of a hardware code between the authentication key 138 and the STB 131 when these devices are operatively docked.

At block 1516, a user interface is provided to enable a user to enter a password. The user interface may be hosted by either the STB 131 or the authentication key 138 as both devices are typically equipped with the necessary resources to provide user interfaces using either built-in displays or EPG-type interfaces presented on a coupled television.

At block 1522, the user password is received and used as the second factor in the two-factor authentication process. For the second factor to be present, the user-entered password must match the password originally entered at the time the parental controls or content blocking were first enabled. If both factors are present (i.e., a verified hardware key presence and correct password), then the restricted media content is unlocked so that it may be rendered by STB 131, as indicated by block 1527.

At block 1530, if either factor fails in the two-factor authentication, then the restricted media content is blocked so it may not be rendered by the STB 131. The illustrative method 1500 ends at block 1534.

Each of the processes shown in the figures and described above may be implemented in a general, multi-purpose, or single purpose processor. Such a processor will execute instructions, either at the assembly, compiled, or machine-level, to perform that process. Those instructions can be written by one of ordinary skill in the art following the description contained herein and stored or transmitted on a computer readable medium. The instructions may also be created using source code or any other known computer-aided design tool. A computer readable medium may be any medium capable of carrying those instructions and includes a CD-ROM (compact disc, read-only memory), DVD (digital versatile disc), magnetic or other optical disc, tape, silicon memory (e.g., removable, non-removable, volatile, or non-volatile), packetized or non-packetized wireline or wireless transmission signals.

What is claimed is:

1. An authentication key that is interoperable with a set top box, comprising:
    an I/O interface arranged for exchanging data with the set top box, the data including media content and authentication data;
    a memory coupled to the I/O interface for storing the media content;
    an authentication engine arranged for performing a two-factor authentication process with the set top box to enable a portion of media content stored in the memory to be rendered by the set top box onto a first presentation device;
    a video processor arranged for rendering the stored media content onto a second presentation device; and
    a docking interface that is arranged to mateably engage with a dock disposed in the set top box so as to enable the data exchange when the authentication key is docked with the set top box.

2. The authentication key of claim 1 in which the authentication data comprises a hardware code, the hardware code being a first factor in the two-factor authentication process.

3. The authentication key of claim 2 in which the hardware code is selected from one of hardware serial number, unit ID, MAC address, randomly generated number, hash value of such codes, or combinations thereof.

4. The authentication key of claim 1 further in which the authentication engine includes password receiving logic for receiving a password that is input at a user interface, the password being a second factor in the two-factor authentication process.

5. The authentication key of claim 4 in which the user interface is hosted by the authentication key.

6. The authentication key of claim 4 in which the user interface is hosted by the set top box.

7. The authentication key of claim 1 in which the second presentation device is a display screen disposed in the authentication key.

8. The authentication key of claim 1 in which the video processor is arranged to selectively generate one of a plurality of output formats, the output formats varying in resolution, aspect ratio, or frame rate.

9. The authentication key of claim 1 in which the video processor includes an MPEG-2-compliant decoder for decoding the stored media content.

10. The authentication key of claim 1 in which the memory is arranged from one of hard disk, RAM, or solid state memory.

11. The authentication key of claim 1 further including a battery.

12. The authentication key of claim 1 in which the first and second presentation devices are each selected from one of television, high-definition television, projector, or monitor.

13. The authentication key of claim 1 further including a remote control interface arranged to be operatively coupled to a remote control device, the remote control interface using a communication protocol selected from one of infrared, RF wireless, USB, USB-2, IEEE-1394, or Zigbee.

14. A set top box comprising:
a network interface arranged to receive media content from a media content provider over a delivery network;
an authentication key interface arranged to exchange data with an authentication key and for transferring the received media for storage in a memory disposed in the authentication key;
an authentication system arranged for (a) interacting with the external authentication key to exchange a hardware code with the authentication key as a first factor in a two-factor authentication protocol, and (b) receiving authorization from the authentication key, upon successful completion of the two-factor authentication, to render a portion of the stored media content onto a presentation device, and (c) blocking rendering of the portion of the recorded media content if the authorization is not received; and
an authentication key receiving bay disposed in a housing of the set top box, the receiving bay including a device connector and a receiving bay opening, the receiving bay opening providing access to the device connector, the device connector being configured for removable engagement with an accessory connector disposed in the authentication key, the device connector and accessory connector providing a communication interface between the set top box and the authentication key that allows data transmission therethrough when operatively coupled.

15. The set top box of claim 14 further including a memory containing instructions for implementing a user interface for enabling entry of a password by a user, the password being a second factor in the two-factor authentication protocol.

16. The set top box of claim 14 in which the communication interface includes a plurality of different interfaces, the interfaces being selected from PS/2, serial, parallel, network, USB or IEEE-1394 interfaces.

17. A computer-readable medium containing instructions which, when executed by one or more processors disposed in an electronic device performs a method, comprising:
attempting to perform two-factor authentication to authenticate a set top box for rendering media content that is subject to a content control paradigm;
verifying the presence of a physically embodied authentication key as a first factor in the two-factor authentication process, the authentication key being removably engagable with a docking connector disposed in the set top box;
providing a user interface for receiving a password as a second factor in the two-factor authentication process;
responsively to the authentication attempting, controlling media content recorded in one of a memory disposed in the authentication key, or a memory disposed in the set top box.

18. The computer-readable medium of claim 17 in which the content control paradigm is one of parental control, content blocking, or content filtering.

19. The computer-readable medium of claim 17 in which the controlling includes unblocking a portion of the stored media content if the attempt to perform two-factor authentication is successful.

20. The computer-readable medium of claim 17 in which the controlling includes blocking a portion of the stored media content if the attempt to perform two-factor authentication is unsuccessful.

* * * * *